I. D. & F. A. MINOR
WHEEL.
APPLICATION FILED JAN. 24, 1911.
1,011,987.
Patented Dec. 19, 1911.
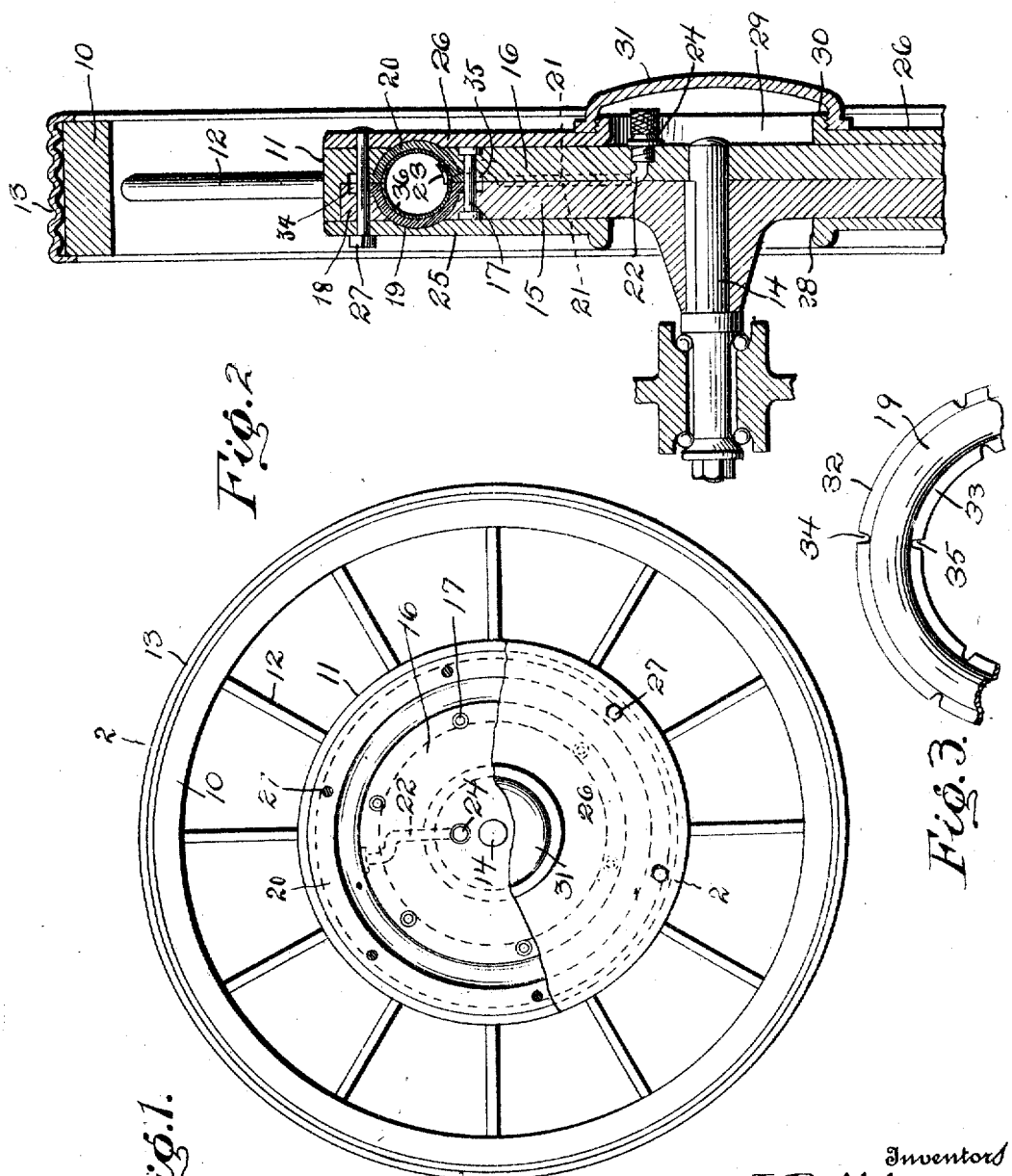
Inventors
I. D. Minor.
F. A. Minor.

UNITED STATES PATENT OFFICE.

IRVING D. MINOR AND FRANK A. MINOR, OF AURELIA, IOWA.

WHEEL.

1,011,987.  Specification of Letters Patent.  Patented Dec. 19, 1911.

Application filed January 24, 1911. Serial No. 604,452.

*To all whom it may concern:*

Be it known that we, IRVING D. MINOR and FRANK A. MINOR, citizens of the United States, residing at Aurelia, in the county of Cherokee and State of Iowa, have invented certain new and useful Improvements in Wheels, of which the following is a specification.

This invention relates to improvements in wheels, more particularly to wheels in which a pneumatic tire feature is embodied, and has for one of its objects to provide a simply constructed wheel wherein the pneumatic tire is protected from contact with the ground and entirely covered and concealed within the structure of the wheel, while at the same time retaining all of the advantages of the pneumatic action.

Another object of the invention is to provide a device of this character so constructed that the pneumatic portion of the wheel may be readily detached for renewal or repairs without removing the wheel from the vehicle.

With these and other objects in view the invention consists in certain novel features of construction as hereinafter shown and described and then specifically pointed out in the claims, and in the drawings illustrative of the preferred embodiment of the invention, Figure 1 is a front elevation of the improved wheel, partly in section; Fig. 2 is an enlarged section on the line 2—2 of Fig. 1. Fig. 3 is a detail view of a portion of one of the pneumatic tire members.

Corresponding and like parts are referred to in the following description and indicated in all the views of the accompanying drawing by the same reference characters.

The improved wheel embraces in its construction an outer rim or felly 10 and an inner rim 11 connected to the outer rim by spokes 12 and with a suitable tire 13 upon the felly, the tire being preferably formed of an annular member corrugated circumferentially to increase the grip of the wheel upon the ground and to prevent skidding or lateral movement when in use.

The axle is represented conventionally at 14, and may be of any required construction, and connected to the axle is a disk member 15 which for the purpose of this description will be referred to as the inner disk member, and bearing upon the inner disk member is another or outer disk member 16, the two disk members corresponding in diameter and detachably connected by bolts or other suitable fastening means 17. At their margins the disk members 15—16 are reversely beveled, as shown in Fig. 2, to form a concaved or channeled outer face. The rim 11 is formed with an inner annular rabbet in which an annular filler member 18 engages, the inner faces of the rim 11 and the filler 18 being reversely beveled to correspond to the beveled edges of the members 15—16. Engaging between the beveled faces of the rim and the disks is the pneumatic member which is formed in two semi-circular parts 19—20 which when united form a complete circle and constitute the outer member of the pneumatic portion of the device. The members 19—20 are provided with lateral flanges 32—33 at their confronting edges, and the flanges are provided with cavities 34—35 at intervals corresponding to the bolts 17—27, and through which the bolts extend, as indicated in Fig. 2. By this means the body of the pneumatic tire member is firmly united and held in position, while at the same time can be readily detached by removing the bolts 27—17 and the inner plate 25. The inflatable inner tube is represented at 36 of the usual construction. The confronting faces of the disk members 15—16 are provided with communicating radial channels, represented at 21, the channel which is located in the disk-member 16 being turned laterally at its inner end and leading through the outer face of the disk member. The channels are designed to receive the air tube, represented conventionally at 22, and connected at one end at 23 in the usual manner in the pneumatic tube and provided at the opposite outturned end with a suitable valve 24, to receive the air pump by which the pneumatic tube is inflated.

Bearing upon opposite sides of the disk members 15—16 and of the inner rim 11 are two annular guard plates 25—26, the guard plates being connected to the inner rim 11 by bolts 27 or other suitable fastening devices. The guard plates are provided centrally with relatively large openings, indicated respectively at 28—29, and surrounding the axle 14, the openings providing for the movements when pressure is applied to the pneumatic tire member. The plate 26 is provided with an externally threaded annular flange 30 to receive a cap 31 which thus extends over the outer end of the axle 14 and likewise over the air tube valve 24.

By this means it will be obvious that a simply constructed wheel is produced which possesses all of the advantages of the ordinary pneumatic tired wheel, while at the same time combining with the pneumatic feature all of the advantages of the ordinary solid rim wheel.

The pneumatic feature of the device is concealed and protected by the plates 25—26, while at the same time the pneumatic tire is free to yield under pressure in the same manner as in the ordinary pneumatic tire.

When the tire requires to be recharged with air it is only necessary to remove the cap 31 to enable the air pump to be applied.

All of the parts of the improved wheel are of metal, and will be constructed as light as possible consistent with the strains to which they will be subjected.

The improved wheel may be of any required size and adapted for vehicles of various kinds, either of the automobile type or of the ordinary vehicle type.

Having thus described our invention, what is claimed as new is:

1. In a wheel, a disk adapted to be connected to an axle and provided with an outwardly directed annular recess, an inner rim concentric to the disk and provided with an inwardly directed annular recess, a tire formed in two annular portions with lateral flanges engaging face to face and fitting respectively in said annular recesses, said flanges each having a plurality of open slots, clamp devices extending through the disk and through the slots in one pair of said flanges, and clamp devices extending through the inner rim and likewise through the slots of the other pair of said flanges.

2. In a wheel, a body including an outer and an inner rim, said inner rim having an inwardly directed annular recess, an inner disk member adapted to be connected to an axle, an outer disk member connected to the inner disk member, said disk members being provided with radial channels in their confronting faces, a pneumatic tire between said disk members and the inner rim and provided with outwardly directed annular flanges engaging in said recesses, an air tube connected to the pneumatic tire and leading through said disk channels, a valve upon said air tube, guard plates connected to said inner rim and bearing upon opposite sides of said disk members and the pneumatic tire, and a cap connected to one of said disk members and covering said air tube valve.

3. In a wheel, a body including a rim having a concaved inner face, an inner disk member adapted to be connected to an axle and having a beveled rim, an outer disk member connected to the inner disk member and having a rim beveled reversely to the rim of the inner disk member, said disk members having communicating channels in their confronting faces, with the terminal of one channel directed laterally through the outer disk, a pneumatic tire engaging the beveled edges of the disk members and the concaved faces of the rim, an air tube connected to said pneumatic tire and leading through said channels and the lateral terminal thereof, guard plates having central openings and connected to said rim and bearing upon opposite sides of said disk members and the pneumatic tire, and a cap detachably engaging one of said guard plates and extending over the opening thereof and over the intake end of the air tube.

In testimony whereof, we affix our signatures in presence of two witnesses.

IRVING D. MINOR. [L. S.]
FRANK A. MINOR.

Witnesses:
W. H. BISCHEL,
D. R. WHITNEY.